US009851511B2

(12) United States Patent
Li et al.

(10) Patent No.: US 9,851,511 B2
(45) Date of Patent: Dec. 26, 2017

(54) AXIAL PRELOAD FOR DEMOUNTABLE CONNECTORS

(71) Applicant: NANOPRECISION PRODUCTS, INC., El Segundo, CA (US)

(72) Inventors: Shuhe Li, Pasadena, CA (US); Gregory L. Klotz, La Verne, CA (US); Michael K. Barnoski, Pacific Palisades, CA (US); Robert Ryan Vallance, Newbury Park, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 15/077,902

(22) Filed: Mar. 22, 2016

(65) Prior Publication Data

US 2016/0274310 A1 Sep. 22, 2016

Related U.S. Application Data

(63) Continuation-in-part of application No. 13/861,273, filed on Apr. 11, 2013, and a continuation-in-part of application No. 13/786,448, filed on Mar. 5, 2013.
(Continued)

(51) Int. Cl.
G02B 6/38 (2006.01)
G02B 6/42 (2006.01)

(52) U.S. Cl.
CPC ......... *G02B 6/3821* (2013.01); *G02B 6/3869* (2013.01); *G02B 6/3887* (2013.01);
(Continued)

(58) Field of Classification Search
CPC .. G02B 6/3821; G02B 6/3885; G02B 6/3887; G02B 6/3897; G02B 6/4206;
(Continued)

(56) References Cited

U.S. PATENT DOCUMENTS 3,658,370 A * 4/1972 Wang .................. E05B 47/0002
24/303
5,261,019 A 11/1993 Beard et al.
(Continued)

FOREIGN PATENT DOCUMENTS

EP 2674796 12/2013
JP 2898864 6/1999

OTHER PUBLICATIONS

International Search Report of Counterpart PCT International Application No. PCT/US2016/023648.

*Primary Examiner* — Akm Enayet Ullah
*Assistant Examiner* — Michael Mooney
(74) *Attorney, Agent, or Firm* — Liu & Liu

(57) ABSTRACT

The present invention provides a spring bias that is particularly suited for use to preload a low profile ferrule of an optical connector. In accordance with the present invention, an axial preload is applied to a connector ferrule by a spring structure provided external of the connector. In one embodiment, spring structure is provided outside a plurality of optical fiber connectors, which provides axial preload of multiple ferrules. Each ferrule could be of the type that supports a plurality of optical fibers of a fiber cable. In one embodiment, the spring bias is effected by a planar flexure external of the connector. The ferrule is coupled to the planar flexure with its longitudinal axis through the center of the planar flexure. The planar flexure is structured with flexure members in a plane that are configured to not create any torque load on the ferrule, or if torque loading is present, insignificant torque load to cause misalignment of the ferrule, when the flexure flexes out of its nominal plane to create an axial preload on the ferrule. In another embodiment, a common yoke is applied to bias planar flexures against a plurality of ferrules, wherein a planar flexure is coupled to each ferrule connector. In a further embodiment
(Continued)

of the present invention, instead of using planar flexures, a yoke is provided to apply an axial preload to all ferrule connectors coupled to the yoke, by means of a coil spring applied to center of the yoke, external of the ferrule connectors.

16 Claims, 9 Drawing Sheets

Related U.S. Application Data

(60) Provisional application No. 62/136,599, filed on Mar. 22, 2015, provisional application No. 61/623,027, filed on Apr. 11, 2012, provisional application No. 61/699,125, filed on Sep. 10, 2012, provisional application No. 61/606,885, filed on Mar. 5, 2012.

(52) U.S. Cl.
CPC .......... *G02B 6/4292* (2013.01); *G02B 6/3885* (2013.01); *G02B 6/3897* (2013.01); *G02B 6/4248* (2013.01); *Y10T 29/49* (2015.01)

(58) Field of Classification Search
CPC .. G02B 6/4214; G02B 6/4231; G02B 6/4248; G02B 6/4249; G02B 6/4292; G02B 6/3869
USPC ...................................................... 385/53–94
See application file for complete search history.

(56) References Cited

U.S. PATENT DOCUMENTS

| 6,287,019 | B1* | 9/2001 | Nagaoka | G02B 6/3878 385/76 |
| 6,375,670 | B1* | 4/2002 | Greenhalgh | A61F 2/013 606/200 |
| 2011/0164851 | A1 | 7/2011 | Ishigami | |
| 2011/0214886 | A1* | 9/2011 | Orr | A62C 35/68 169/37 |
| 2015/0305902 | A1* | 10/2015 | Argentine | A61F 2/966 623/1.12 |

* cited by examiner

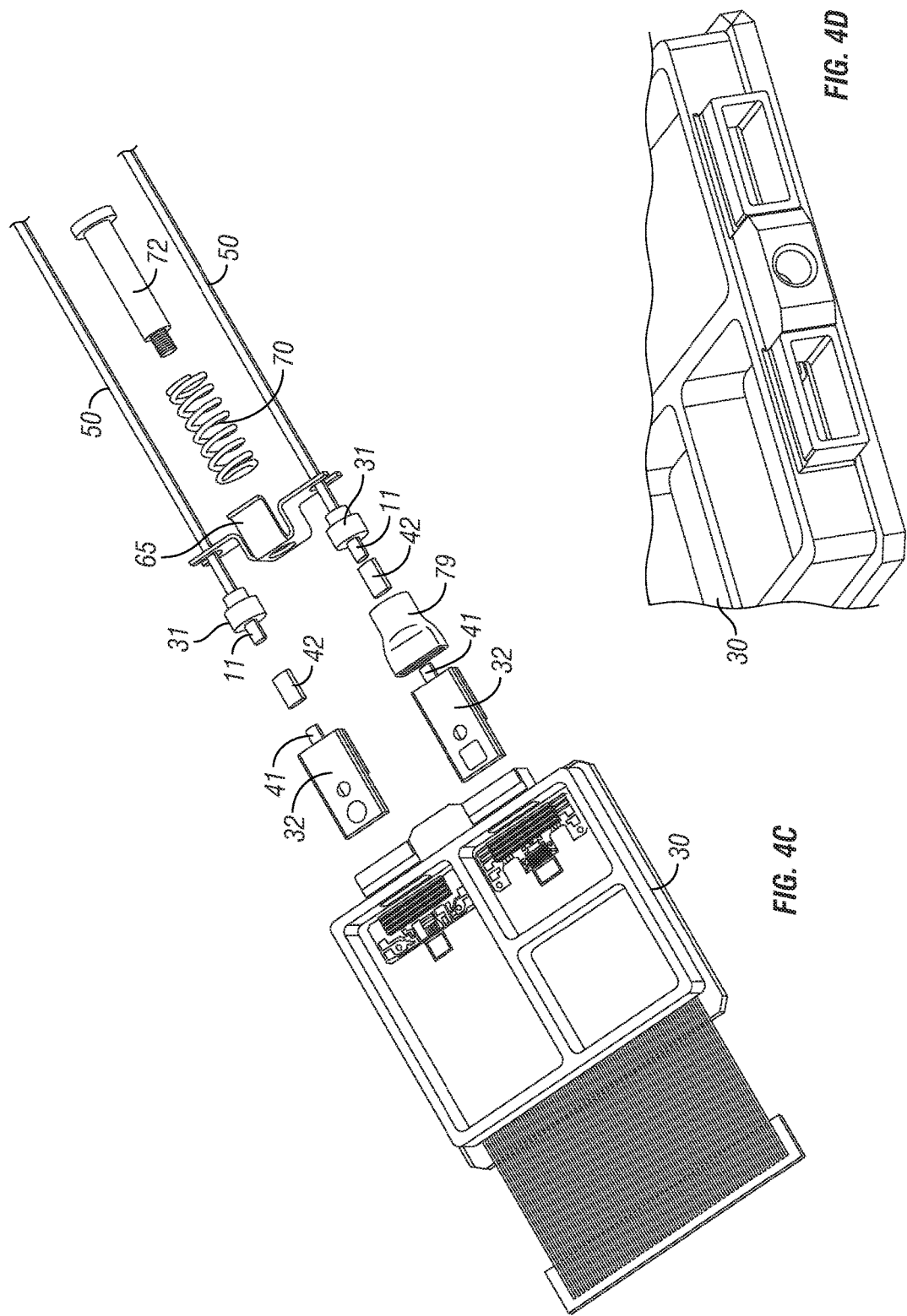

AXIAL PRELOAD FOR DEMOUNTABLE CONNECTORS

PRIORITY CLAIM

This application:
(1) claims the priority of U.S. Provisional Patent Application No. 62/136,599 filed on Mar. 22, 2015; and
(2) is a continuation-in-part of U.S. patent application Ser. No. 13/861,273 filed on Apr. 11, 2013, which:
  (a) claims the priority of U.S. Provisional Patent Application No. 61/623,027 filed on Apr. 11, 2012,
  (b) claims the priority of U.S. Provisional Patent Application No. 61/699,125 filed on Sep. 10, 2012, and
  (c) is a continuation-in-part of U.S. patent application Ser. No. 13/786,448 filed on Mar. 5, 2013, which claims the priority of U.S. Provisional Patent Application No. 61/606,885 filed on Mar. 5, 2012.

GOVERNMENT RIGHTS

This invention was made with government support under Contract No. N68335-12-C-0123 awarded by NAVAL AIR WARFARE CTR AIRCRAFT DIVISION. The government has certain rights in the invention.

BACKGROUND OF THE INVENTION

1. Field of the Invention

The present invention relates to demountable connections for optical fibers, in particular demountable connections to hermetic optical fiber feedthrough.

2. Description of Related Art

Given the increasing bandwidth requirements for modern day data transmission (e.g., for high definition video data), fiber optic signal transmissions have become ubiquitous for communicating data. Optical signals are transmitted over optical fibers, through a network of optical fibers and associated connectors and switches. The optical fibers demonstrate a significantly higher bandwidth data transmission capacity and lower signal losses compared to copper wires for a given physical size/space.

In fiber optic signal transmission, conversions between optical signals and electrical signals take place beyond the terminating end of the optical fiber. Specifically, at the output end of an optical fiber, light from the optical fiber is detected by a transducing receiver and converted into an electrical signal for further data processing downstream (i.e., optical-to-electrical conversion). At the input end of the optical fiber, electrical signals are converted into light to be input into the optical fiber by a transducing transmitter (i.e., electrical-to-optical conversion).

The optoelectronic devices (receiver and transmitter and associated optical elements and electronic hardware) are contained in an optoelectronic module or package. The optical fiber is introduced from outside the housing of the optoelectronic module, through an opening provided in the housing wall. The end of the optical fiber is optically coupled to the optoelectronic devices held within the housing. A feedthrough element supports the portion of the optical fiber through the wall opening. For a variety of applications, it is desirable to hermetically seal the optoelectronic devices within the housing of the optoelectronic module, to protect the components from corrosive media, moisture and the like. Since the package of the optoelectronic module must be hermetically sealed as whole, the feedthrough element must be hermetically sealed, so that the electro-optic components within the optoelectronic module housing are reliably and continuously protected from the environment.

U.S. Patent Application Publication No. US2013/0294732A1 discloses a hermetic optical fiber feedthrough assembly in which the a hermetic ferrule assembly provides a demountable terminal for the optoelectronic package/module, for coupling to another optical device, such as an optical fiber ribbon (e.g., a patch cord having similarly shaped ferrules), using an alignment sleeve (e.g., a split sleeve having complementary shape sized to receive the ferrule assembly and the ferrule on the patch cord). The ferrule/terminal is low-profile, having a generally oval-shaped cross-section, supporting multiple optical fibers. The hermetic ferrule assembly may be deemed to be a demountable hermetic terminal of the package, that provides an alignment ferrule for optical alignment to external devices. With this embodiment, a defective external optical fiber ribbon may be replaced by plugging a replacement fiber ribbon onto the hermetical ferrule terminal, without having to replace the entire package, which can be quite expensive given the electronics contained in the package.

Current optical fiber connectors have not changed in basic design for many years. The basic connector unit is a connector assembly. The connector includes an assembly of components consisting of a ferrule, a ferrule housing, a cable jacket or boot, and other hardware provided within or outside the housing (e.g., cable strain relief, crimp, biasing spring, spacer, etc.). The ferrule and the terminating end faces of the fibers are polished. The ferrule in the optical fiber connector is spring-loaded to provide an axial preload bias to press together the polished end faces of the fibers in two connectors in an end-to-end configuration. In most cases, the intent is to establish physical contact between coupled fibers to prevent loss of light. Physical contact avoids a trapped layer of air between two fibers, which would increase connector insertion loss and reflection loss.

U.S. Pat. No. 5,261,019 discloses a demountable fiber optic connector includes a coil spring to bias the ferrule in the barrel of the connector against a connector end of a housing. As explained in this patent, in installation, an optical fiber connector experiences disruptive forces from time to time. For example, axial loads may be applied to a connector. The axial load may result from a person inadvertently pulling on a cable which is attached to a connector. If axial loads result in the connector ferrule moving away from an optically coupled opposing ferrule, the optical circuit may be disrupted or disconnected. Accordingly, fiber optic connectors should provide means for preventing disruption of the circuit in response to an axial load applied to the connector. The internal spring in the connector provides an axial preload on the connector ferrule, but also a twisting load (i.e., a torque loading) on the ferrule, which is undesirable as it could twist the ferrule (and hence the optical fiber held in the ferrule) to an extent affecting the optical alignment at the connection. Further, the connector disclosed in this patent is relatively bulky, given the various components including the coil spring in the connector. This connector works with relatively large connector structures, but would not be compatible with the relatively low profile, oval shaped ferrule connectors disclosed in PCT Patent Application Publication No. WO2014/011283A2 and U.S. Patent Publication No. US2013/0294732A1. The low profile ferrule connectors have small footprints, so they are particularly suited for connections of a high density of optical fibers (which are grouped into optical fiber cables) for a given space. Prior art connectors are too bulky, so less optical fibers/cables can fit into a smaller space.

What is needed is an improved approach to providing a preload to an optical fiber connector for a demountable connection to another connector or connector end of a housing, such as a hermetic optical fiber feedthrough assembly, which improves optical alignment, manufacturability, ease of use, functionality and reliability at reduced costs.

SUMMARY OF THE INVENTION

The present invention provides an improved axial preload of ferrule connectors for demountable optical fiber connections, such as demountable connections to hermetic optical fiber feedthrough, which improves optical alignment, manufacturability, ease of use, functionality and reliability at reduced costs, thereby overcoming many of the drawbacks of the prior art structures. The present invention provides a spring bias that is particularly suited for use to preload a low profile ferrule of an optical connector.

In accordance with the present invention, an axial preload is applied to a connector ferrule by a biasing structure provided external of the connector. In one embodiment, the biasing structure is provided outside a plurality of optical fiber connectors, which provides axial preload of multiple ferrules. Each ferrule could be of the type that supports a plurality of optical fibers of a fiber cable.

In one embodiment, the axial preload bias is effected by a spring in the form of a planar flexure external of the connector. The ferrule is coupled to the planar flexure with its longitudinal axis through the center of the planar flexure. The planar flexure is structured with flexure members in a plane that are configured to not create any torque load on the ferrule, or if torque loading is present, insignificant torque load to cause misalignment of the ferrule, when the flexure flexes out of its nominal plane to create an axial preload on the ferrule.

In another embodiment, a common yoke is applied to bias planar flexures against a plurality of ferrules, wherein a planar flexure is coupled to each ferrule connector.

In a further embodiment of the present invention, instead of using planar flexures, a yoke is provided to apply an axial preload to all ferrule connectors coupled to the yoke, by means of a coil spring applied to center of the yoke, external of the ferrule connectors.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 4A to 4F are various views of an axial preload structure in accordance with another embodiment of the present invention.

DETAILED DESCRIPTION OF THE PREFERRED EMBODIMENTS

Figure 1:
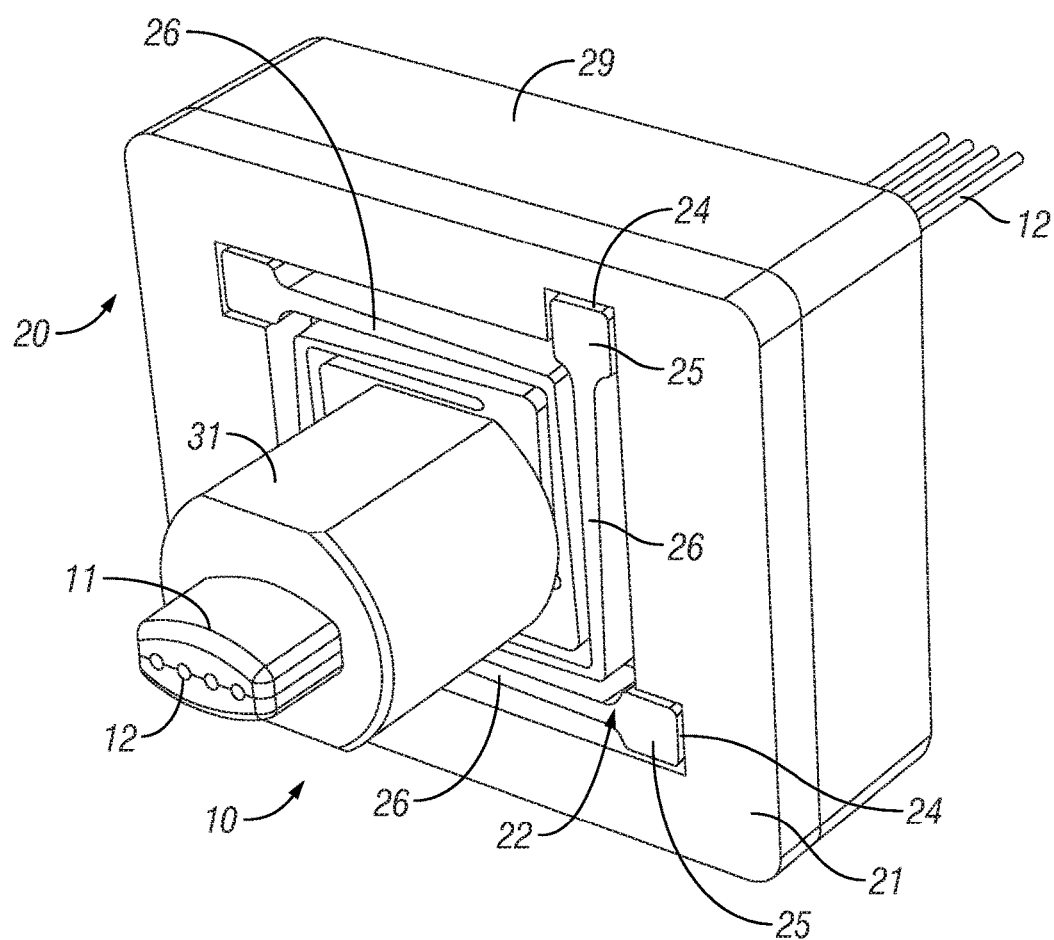
FIG. 1 is a schematic perspective view a ferrule connector coupled to a planar flexure in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved axial preload of ferrule connectors for demountable optical fiber connections, such as demountable connections to hermetic optical fiber feedthrough, which improves optical alignment, manufacturability, ease of use, functionality and reliability at reduced costs, thereby overcoming many of the drawbacks of the prior art structures. The present invention provides a spring bias that is particularly suited for use to preload a low profile ferrule of an optical connector.

In accordance with the present invention, an axial preload is applied to a connector ferrule by a spring structure provided external of the connector.

Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee. The priority of certain pending applications had been claimed herein.

For example, U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which defined on a metal base is a structured surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 9,213,148 further discloses a similar hermetic optical fiber alignment assembly, but without an integrated structured reflective surface.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a bulk material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the bulk material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

U.S. Pat. No. 8,961,034 discloses a method of producing a ferrule for supporting an optical fiber in an optical fiber connector, comprising stamping a metal blank to form a body having a plurality of generally U-shaped longitudinal open grooves each having a longitudinal opening provided on a surface of the body, wherein each groove is sized to securely retain an optical fiber in the groove by clamping the optical fiber. The optical fiber is securely retained in the body of the ferrule without the need for additional fiber retaining means.

PCT Patent Application Publication No. WO2014/011283A2 discloses a ferrule for an optical fiber connector, which overcomes many of the drawbacks of the prior art ferrules and connectors, and further improves on the above noted pin-less alignment ferrules. The optical fiber connector includes an optical fiber ferrule, which has a generally oval cross-section for aligning an array of multiple optical fibers to optical fibers held in another ferrule using a sleeve.

The above inventive concepts are incorporated by reference herein, and will be referred below to facilitate disclosure of the present invention. The present invention is disclosed in connection with exemplary embodiments of hermetic optical fiber feedthrough for hermetic optoelectronic packages, which provides a terminal for demountable connections to the packages.

In one embodiment, the spring bias is effected by a planar flexure external of the connector. The ferrule is coupled to the planar flexure with its longitudinal axis through the center of the planar flexure. The planar flexure is structured with flexure members in a plane that are configured to not create any torque load on the ferrule, or if torque loading is present, insignificant torque load to cause misalignment of the ferrule, when the flexure flexes out of its nominal plane to create an axial preload on the ferrule.

FIG. 1 is a schematic perspective view a ferrule connector 10 coupled to a planar flexure 20 in accordance with one embodiment of the present invention. The ferrule connector 10 comprises a ferrule 11 that supports at least one optical fiber 12 (four optical fibers 12 in the illustrated embodiment, which has a generally oval cross-section, as disclosed in PCT Patent Application Publication No. WO2014/011283A2. The flexure 20 is supported on a base 29 having an opening (not shown in this view) to allow movement of the ferrule connector 10 in its axial direction. The flexure 20 includes a frame 21 supporting a flexure structure 22 in the center of the frame 21. In this embodiment, the distal end of each flexure members 26 of the flexure structure 22 are coupled/anchored to slots 24 provided in the frame 21.

Figure 2A:
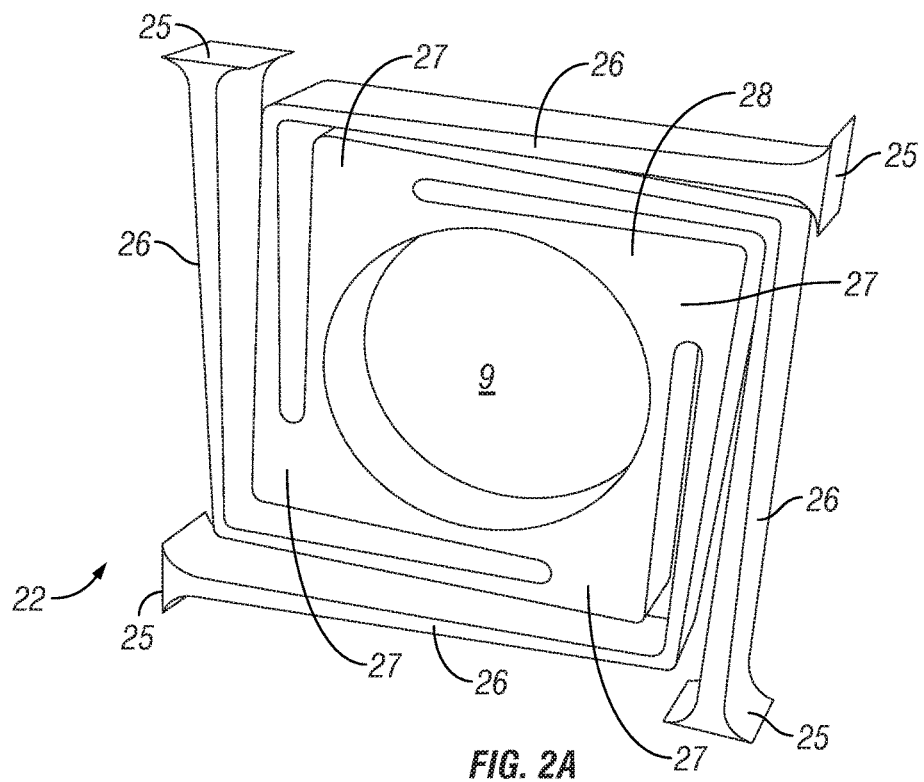
FIGS. 2A and 2B are alternate views of alternate planar structures, in accordance with other embodiments of the present invention.
Figure 2B:
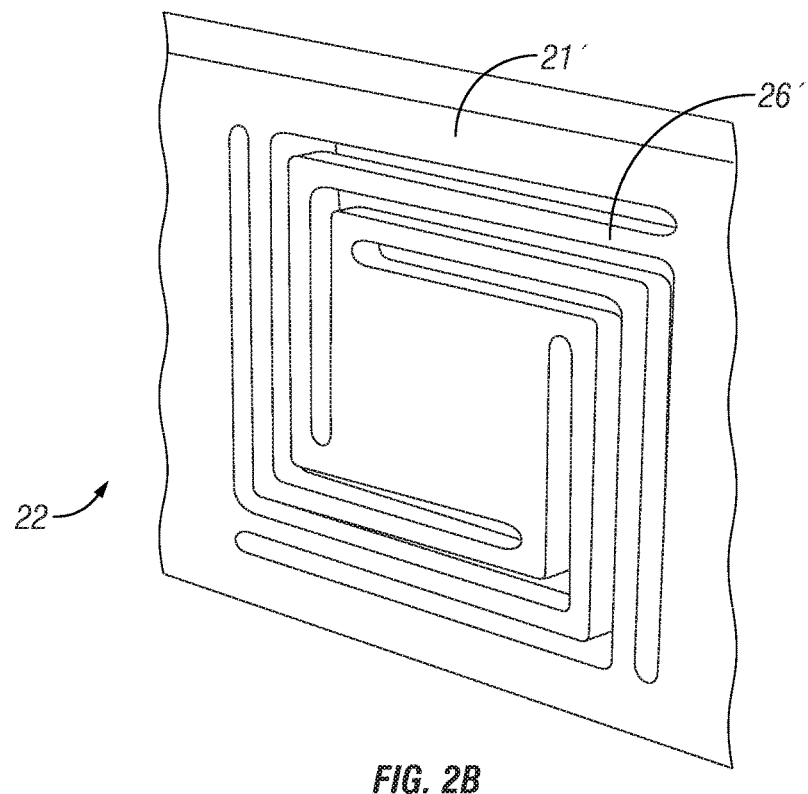

FIGS. 2A and 2B provides better view of the configuration of the flexure structure 22. FIG. 2A shows the flexure structure 22 without the frame 21 in FIG. 2A.

In the illustrated embodiment, the flexure structure 22 includes four flexure members 26. Each flexure member 26 is a slender, generally L-shaped beam, cantilever at a corner 27 of the body 28 of the flexure structure 22. In this embodiment, the end of the respective flexure members 26 is enlarged, for example, to anchor into a slot 24 provided in the frame 21. As configured, body 28 of the flexure structure 22 can move in a direction perpendicular to the plane of the flexure structure 22, with combination of the flexure members 26 providing a spring load. The body 28 has an opening 9 in the center for coupling to the ferrule connector 10.

Figure 3A:
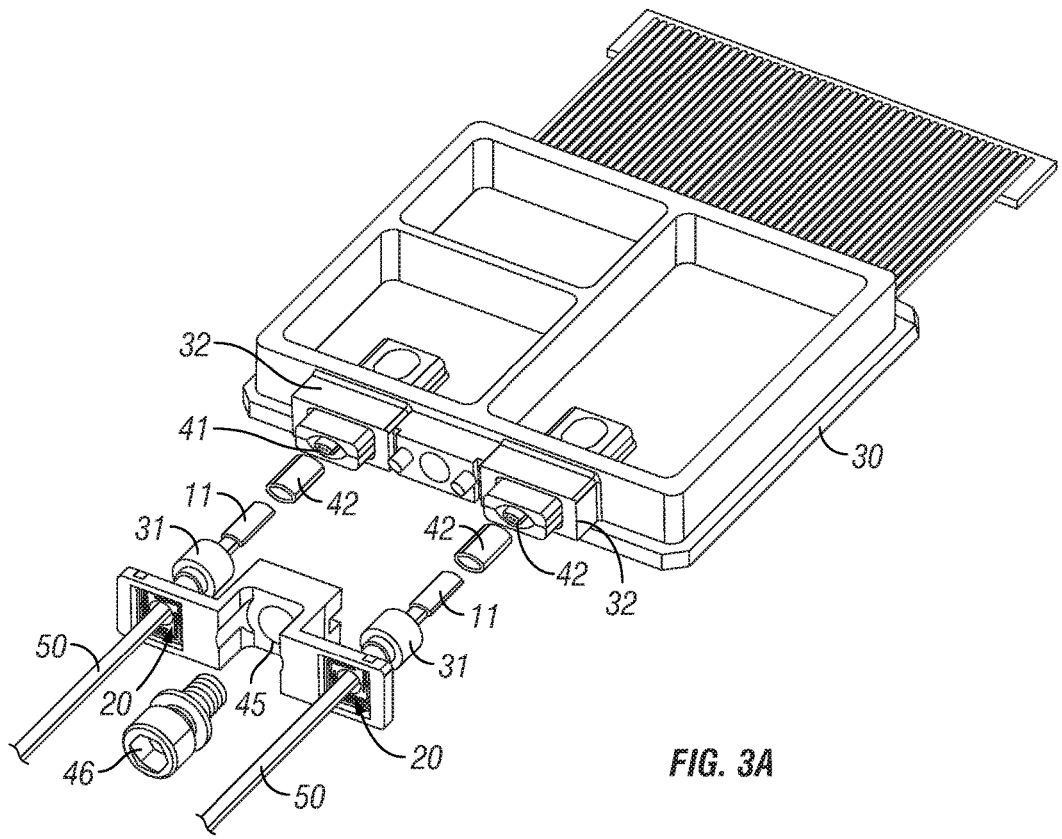
FIGS. 3A to 3D illustrate an axial preload structure using planar flexures for a demountable connection in accordance with one embodiment of the present invention.
Figure 3B:
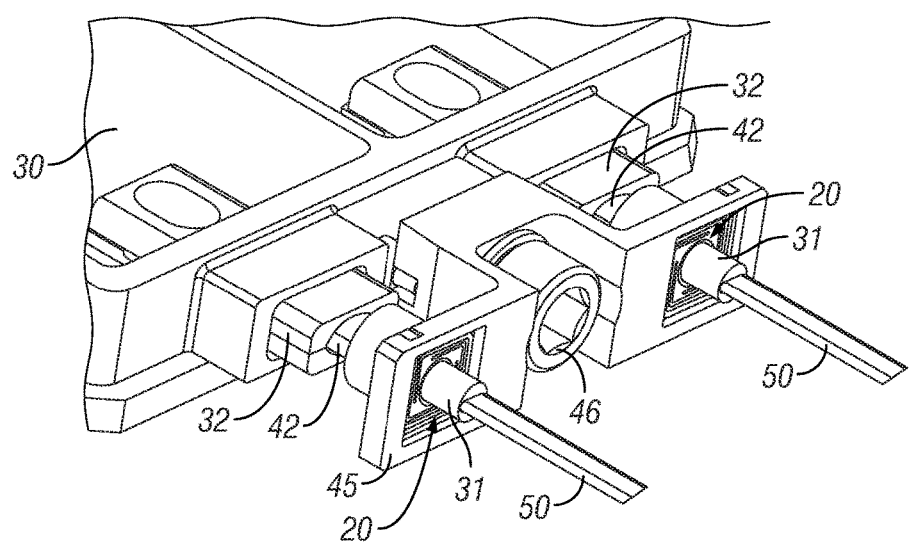
Figure 3C:
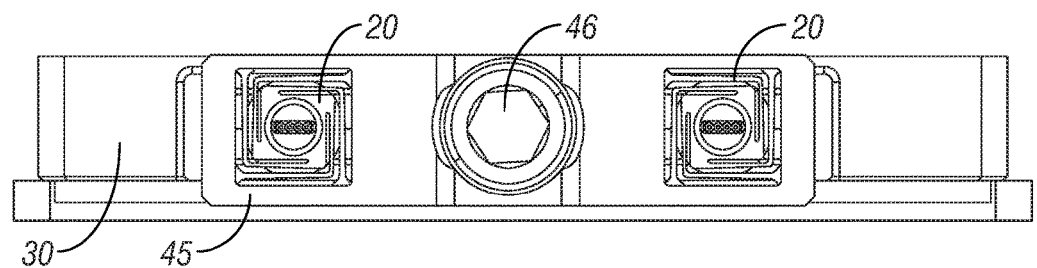
Figure 3D:
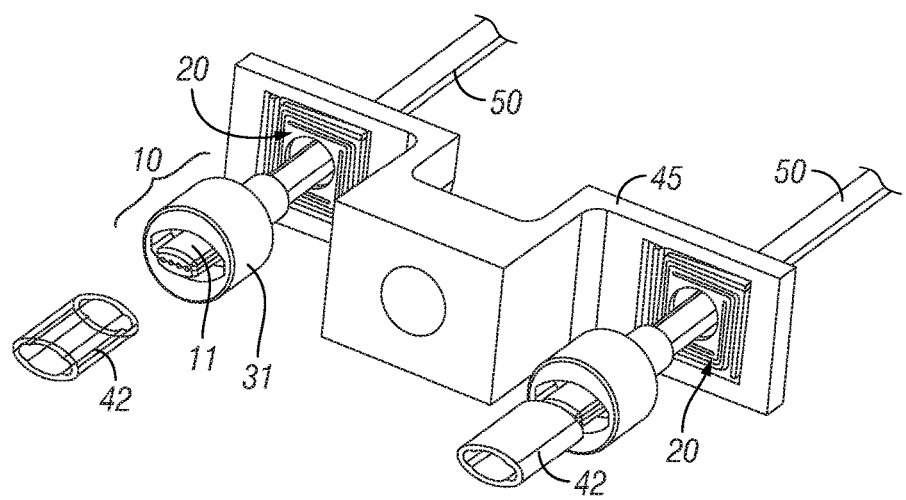
Figure 4A:
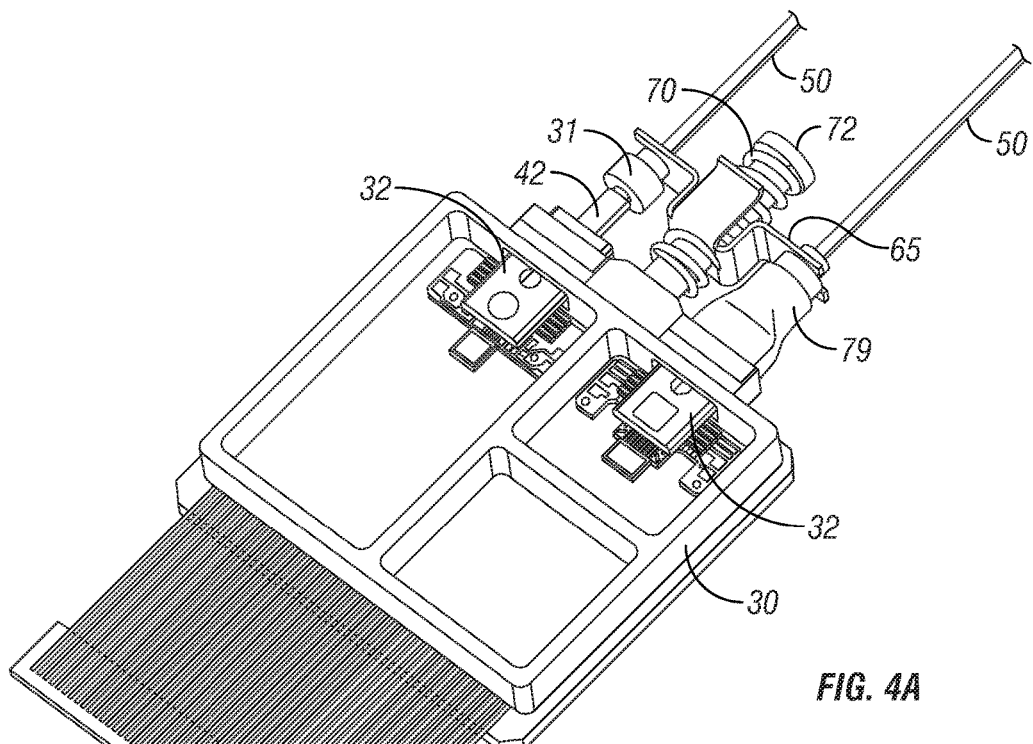
Figure 4B:
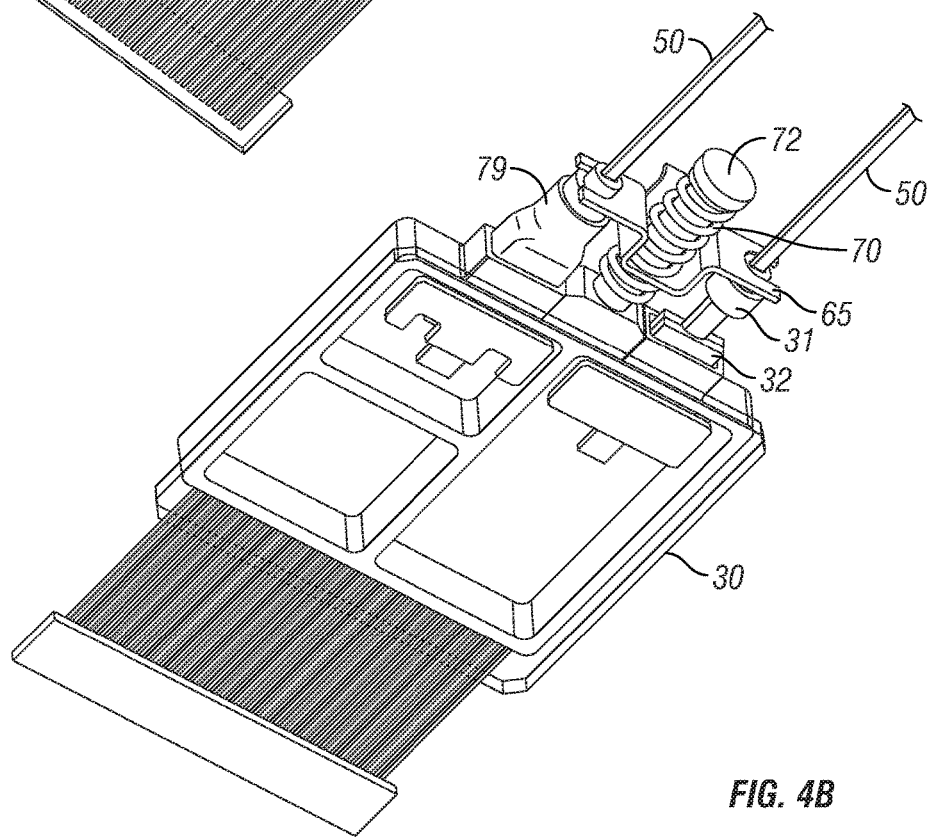
Figure 4E:
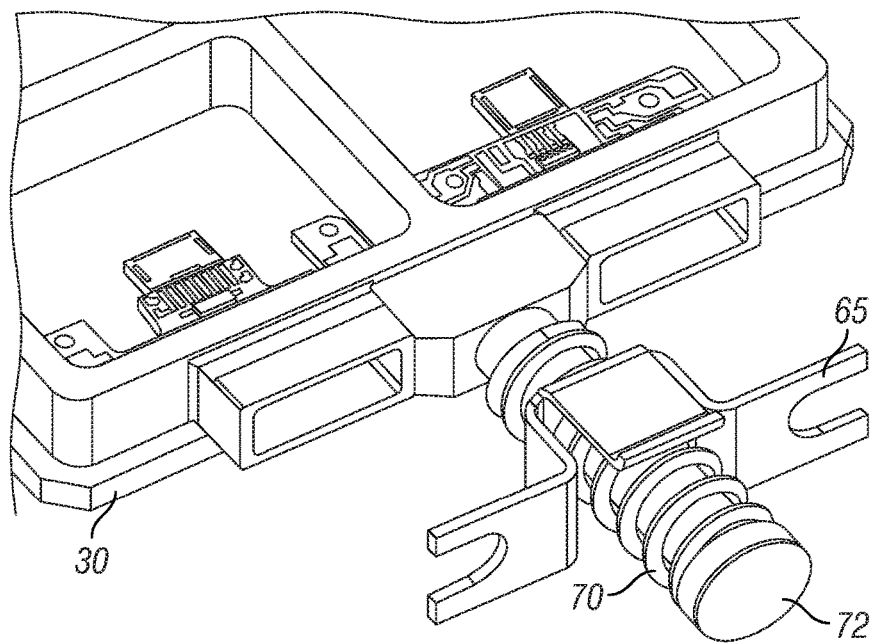
Figure 4F:
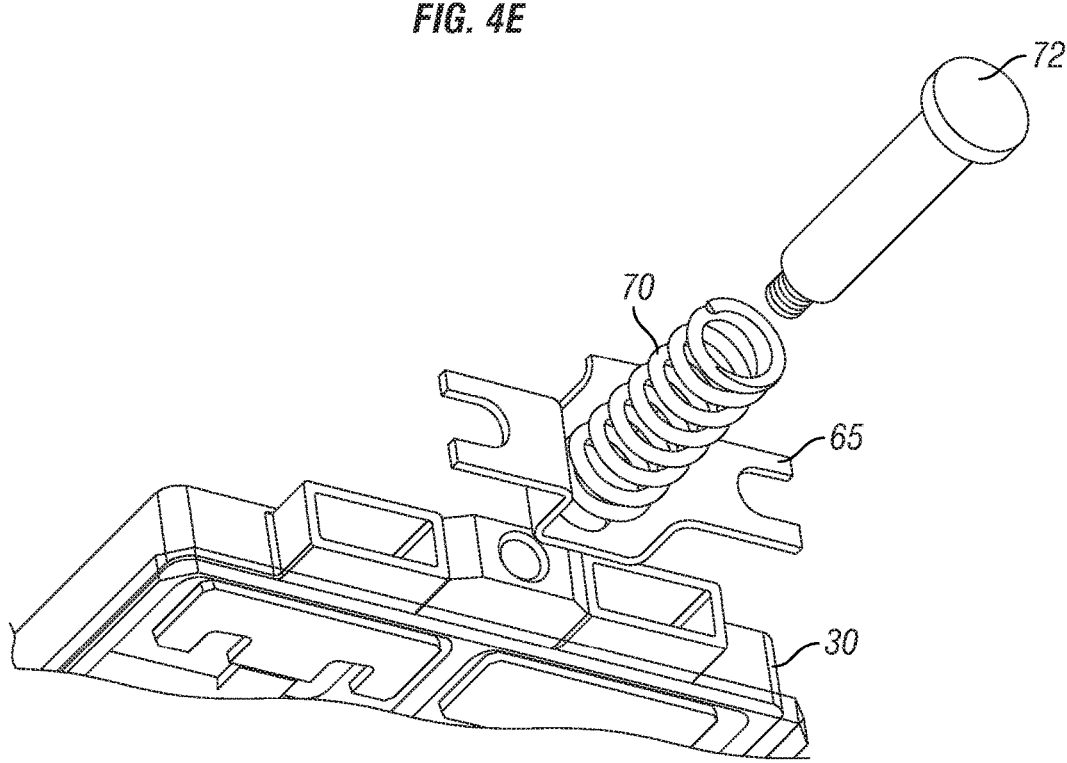

The ferrule connector 10 includes a boot 31 (e.g., a rubber or plastic material) covering a rear end of the ferrule 11, with a narrower end seated in the opening 9 in the body of the flexure 20 (more clearly shown in FIGS. 3B and 3D). The boot 31 couples the ferrule connector 10/ferrule 11 to the flexure 20. Thus, the ferrule 11 can translate in its axial direction, when supported by the flexure 20.

In FIG. 2B, the flexure structure 22' is shown without an opening in the center. In this embodiment, the distal ends of the flexure members 26' are fixedly connected to the frame 21'.

In one embodiment, spring structure is provided outside a plurality of optical fiber connectors, which provides axial preload of multiple ferrules. Each ferrule could be of the type that supports a plurality of optical fibers of a fiber cable. FIGS. 3A to 3D illustrate an axial preload structure using planar flexures for a demountable connection of a plurality of ferrule connectors, in accordance with one embodiment of the present invention.

FIG. 3A illustrate a hermetic optoelectronic package/module 30, with its hermetic cover removed from view. Hermetic optical fiber feedthroughs 32 are fixedly attached to the housing of the package 30. The feedthroughs 32 each provides a generally oval-shaped ferrule terminal connector 41, for a demountable connection. The configuration of the hermetic package and feedthroughs had been disclosed in U.S. Patent Publication No. US2013/0294732A1.

A ferrule connector 10 as structured in FIG. 1 can be applied to connect optical fiber(s) 12 in an optical fiber cable 50 to the connector 41. In this embodiment, the optical fiber cable 41 holds a ribbon of four optical fibers 12. Generally oval-shaped alignment sleeves 42 are used to connect the ferrule 11 and ferrule 41 together, as disclosed in PCT Patent Application Publication No. WO2014/011283A2.

For each optical fiber cable 50, a flexure 20 as in FIG. 1 is coupled to provide an axial preload on the ferrule connector 10. The flexure 20 is supported by a yoke 45, which is attached by a screw 46 to the housing of the package 30. The yoke 45 is configured and sized such that in this attached position, the flexure 20 flexes out of plane in a direction away from the package housing. Thereby, an axial preload is biased against the larger end of the boot 31, to thereby bias the ferrule 11 towards the opposing ferrule 41. FIG. 3C is a front view of the flexures 20 in the yoke 45.

In another embodiment, a common yoke is applied to bias planar flexures against a plurality of ferrules, wherein a planar flexure is coupled to each ferrule connector. In a further embodiment of the present invention, instead of using planar flexures, a yoke is provided to apply an axial preload to all ferrule connectors coupled to the yoke, by means of a coil spring applied to center of the yoke, external of the ferrule connectors.

FIGS. 4A to 4F are various views of an axial preload structure in accordance with another embodiment of the present invention. In this embodiment, instead of using planar flexures to provide an axial preload, the boot 31 of the ferrule connector 10 is supported directly by a yoke 65 that "floats" on a threaded guide pin 72 attached (e.g., screwed) to the housing of the package 30, and a coil spring 70 is used to couple the yoke 65 for movement along the guide pin 72.

Figure 5A:
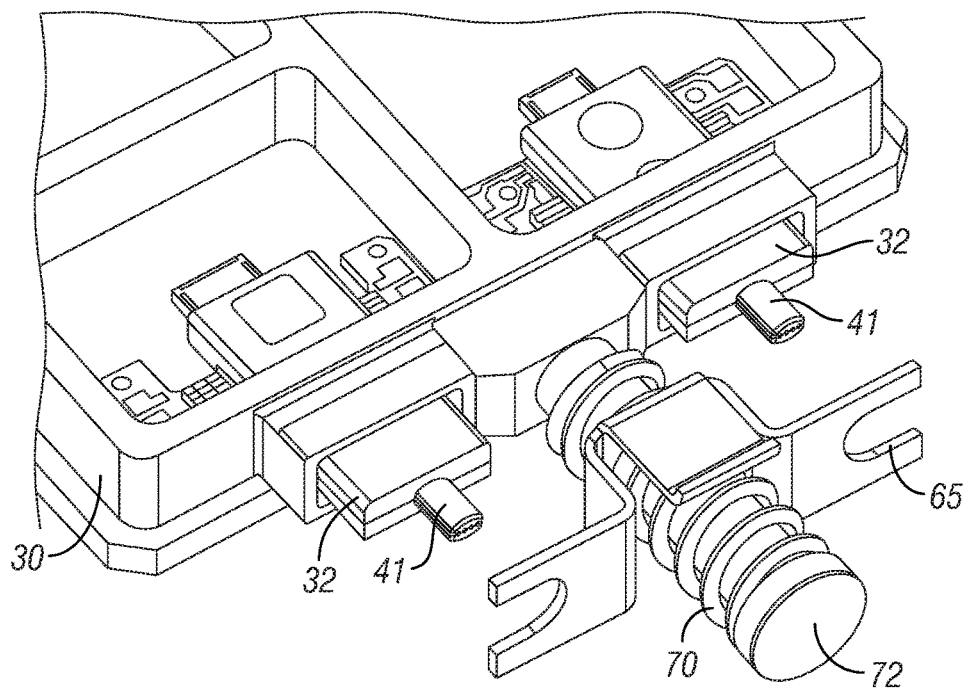
FIGS. 5A to 5D illustrate the sequence of assembling the ferrule connectors with the axial preload structure in FIGS. 4A to 4F.
Figure 5B:
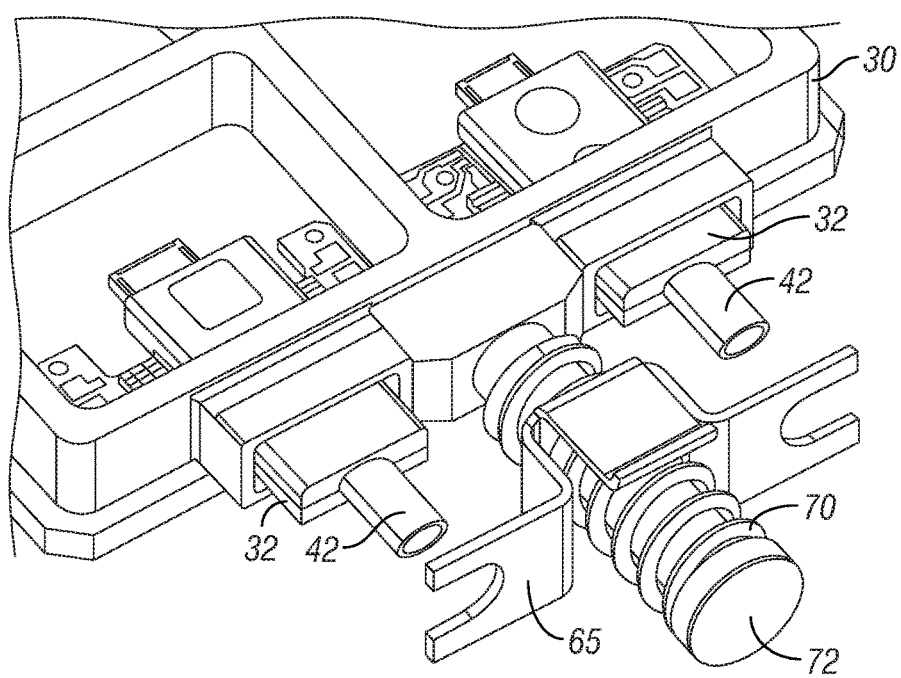
Figure 5C:
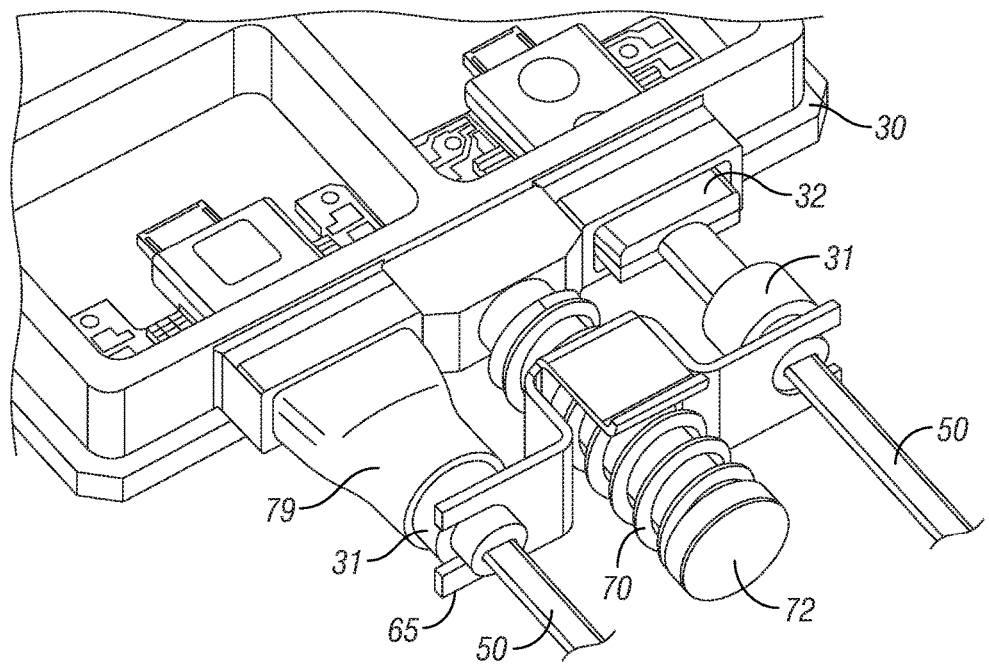
Figure 5D:
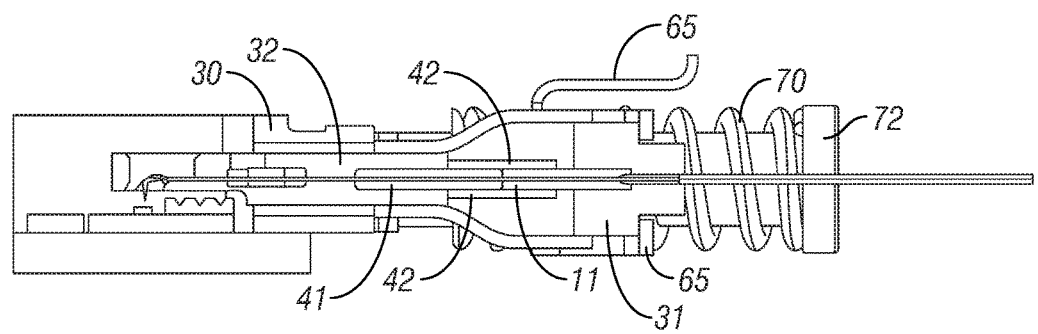

FIGS. 5A to 5D illustrate the sequence of assembling the components including the ferrule connectors 10 and the axial preload structure shown in FIGS. 4A to 4F. FIG. 5A shows the yoke 65 being loosely positioned on the housing of the package 30 with the guide pin 72 slightly threaded into the package housing. FIG. 5B shows alignment sleeves 42 slipped onto the ferrules 41. FIG. 5C shows the ferrule connectors 10 with ferrules 11 connected in the alignment sleeves 42, the locking pin 72 is fully attached to the housing of the package 30. The coil spring 70 is compressed, thus loading against the yoke 65, which in turn presses on the large ends of the boots 31 to provide an axial preload on the ferrule connectors 10/ferrules 11. In this embodiment, the ferrule connector 10 may include a dust boot 79 covering the ferrule 11 and the sleeve 42. FIG. 5D is a sectional view showing the axial preload on the ferrule connector 10/ferrule 11 under spring bias on the yoke 65 outside the ferrule connectors 10.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An axial preload structure for providing an axial preload to at least a ferrule connector for a demountable connection, comprising a biasing structure external of the ferrule connector, wherein the biasing structure comprises a planar flexure external of the ferrule connector, wherein the planar flexure flexes out of its nominal plane to create an axial preload on the ferrule, and wherein the ferrule connector comprises a ferrule supporting at least one optical fiber.

2. The axial preload structure as in claim 1, wherein the ferrule is coupled to the planar flexure with its longitudinal axis through the center of the planar flexure.

3. The axial preload structure as in claim 2, wherein the planar flexure is structured with a plurality of flexure members in the nominal plane of the planar flexure, which are configured to not create any torque load on the ferrule, or if torque loading is present, insignificant torque load to cause misalignment of the ferrule, when the flexure flexes out of its nominal plane to create the axial preload on the ferrule.

4. The axial preload structure as in claim 1, wherein a common yoke is applied to bias a plurality of planar flexures against a plurality of ferrules, wherein each planar flexure is coupled to a corresponding ferrule.

5. The axial preload structure as in claim 1, wherein the planar flexure comprises a body coupled to the ferrule, and a plurality of flexure members distributed around the body in the nominal plane of the planar flexure, wherein one end of each flexure member is cantilevered to the body, wherein the body moves perpendicular to the nominal plane of the flexure when the flexure members flexes, thereby creating the axial preload on the ferrule.

6. The axial preload structure as in claim 5, wherein another end of each flexure member is coupled to a frame around the flexure members.

7. The axial preload structure as in claim 6, wherein each flexure member is generally L-shaped in the nominal plane of the flexure.

8. The axial preload structure as in claim 5, wherein each flexure member is generally L-shaped in the nominal plane of the flexure.

9. The axial preload structure as in claim 2, wherein the ferrule connector comprises a boot, and wherein the boot couples the ferrule to the planar flexure.

10. The axial preload structure as in claim 1, wherein the planar flexure is structured with a plurality of flexure members in the nominal plane of the planar flexure, which are configured to not create any torque load on the ferrule, or if torque loading is present, insignificant torque load to cause misalignment of the ferrule, when the flexure flexes out of its nominal plane to create the axial preload on the ferrule.

11. The axial preload structure as in claim 10, wherein the planar flexure comprises a body coupled to the ferrule, and the plurality of flexure members distributed around the body in the nominal plane of the planar flexure, wherein one end of each flexure member is cantilevered to the body, wherein the body moves perpendicular to the nominal plane of the flexure when the flexure members flexes, thereby creating the axial preload on the ferrule.

12. The axial preload structure as in claim 11, wherein another end of each flexure member is coupled to a frame around the flexure members.

13. The axial preload structure as in claim 12, wherein each flexure member is generally L-shaped in the nominal plane of the flexure.

14. The axial preload structure as in claim 11, wherein each flexure member is generally L-shaped in the nominal plane of the flexure.

15. The axial preload structure as in claim 1, wherein the ferrule has a generally oval cross-section.

16. An optical connector, comprising the axial preload structure as in claim 1.

\* \* \* \* \*